(12) United States Patent
Takahashi

(10) Patent No.: US 6,321,185 B1
(45) Date of Patent: Nov. 20, 2001

(54) ESTIMATION SYSTEM OF LSI POWER CONSUMPTION

(75) Inventor: Naoya Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/252,891

(22) Filed: Feb. 19, 1999

(30) Foreign Application Priority Data

Feb. 27, 1998 (JP) ................................... 10-047722

(51) Int. Cl.[7] ................................................. G06F 17/50
(52) U.S. Cl. .................... 703/15; 703/18; 716/7
(58) Field of Search ........................... 703/13, 14, 15, 703/18, 22; 716/7, 18

(56) References Cited

U.S. PATENT DOCUMENTS

| | | |
|---|---|---|
| 5,598,344 | 1/1997 | Dangelo et al. . |
| 5,673,200 * | 9/1997 | Toyonaga et al. ..................... 716/18 |
| 5,805,459 * | 9/1998 | Kapoor ................................... 703/14 |
| 5,838,947 * | 11/1998 | Sarin ...................................... 703/14 |

(List continued on next page.)

OTHER PUBLICATIONS

S. Turgis et al, "A Novel Macromodel for Power Estimation in CMOS Structures", IEEE Transactions on Computer–Aided Design of Integrated Circuits and Systems, vol. 17, No. 11, Nov. 1998 with Abstract.

Najm, F.N., "A survey of Power Estimation Techniques in VLSI Circuits", IEEE Transactions on Very Large Scale Integration Systems, vol. 2, Issue 4, pp. 446–455, Dec. 1994.*

Nemani et al., "Towards a High–Level Power Estimation Capability [Digital ICs]", IEEE Transactions on Computer–Aided Design of Integrated Circuits and Systems, vol. 15, Issue 6, pp. 588–598, Jun. 1996.*

Landman, P., "High–Level Power Estimation", International Symposium on Low Power Electronics and Design, 1996, pp. 29–35, Aug. 1996.*

(List continued on next page.)

Primary Examiner—Kevin J. Teska
Assistant Examiner—Douglas W. Sergent
(74) Attorney, Agent, or Firm—Sughrue, Mion, Zinn, Macpeak & Seas, PLLC

(57) ABSTRACT

Power consumption of an LSI chip is estimated at the beginning stage of the designing without using the HDL description. An I/O part power of a new designing LSI chip is calculated by an equation with using the outside specifications required by the application of the LSI chip. An I/O part power of an original LSI chip is calculated by the outside specifications, the core circuitry part power of the original LSI chip is calculated by subtracting this calculated I/O part power of the original LSI chip from the known total power of the original LSI chip, and converting the voltage and process and frequency, the core circuitry part power of the new designing LSI chip is calculated. The kinds of functions, voltage, frequency, the number of gates, unit capacity and clock structure of the new designing LSI chip are given and referring to the data base of ratio of each function described the ratio of the number of FF and the ratio of clock power/logic power, the clock system power is calculated by the number of FF and the clock structure. The logic system power is calculated by the ratio of the clock power/the logic power. The modifiable circuitry part power is calculated by summing up the I/O part power, the core circuitry part power, the clock system power and the logic system power.

30 Claims, 7 Drawing Sheets

U.S. PATENT DOCUMENTS 5,949,689 * 9/1999 Olson et al. ............................ 703/14
6,125,334 * 9/2000 Hurd ...................................... 703/22

Wu et al., "Cycle–Accurate Macro–Models for RT–Level Power Analysis", IEEE Transactions on Very Large Scale Integration Systems, vol. 6, Issue 4, pp. 520–528, Dec. 1998.*

OTHER PUBLICATIONS

Gupta et al., "Power Macromodeling for High Level Power Estimation", Proceedings of the 34th Design Automation Conference, pp. 365–370, Jun. 1997.*

Givarlis et al., "Interface Exploration for Reduced Power in Core–Based Systems", Proceedings 11th International Symposium on System Synthesis, pp. 117–122, Dec. 1998.*

Fornaciari et al., "System–Level Power Evaluation Metrics", Proceedings Second Annual IEEE International Conference on Innovative Systems in Silicon, pp. 323–330, Oct. 1997.*

Yeh et al., "OPERAS/spl minus/an Object–Oriented Signal Processing System Architecture Simulator", 27th Annual Simulation Symposium, pp. 198–207, Apr. 1994.*

* cited by examiner

ESTIMATION SYSTEM OF LSI POWER CONSUMPTION

BACKGROUND OF THE INVENTION

The present invention relates to an estimation system of LSI (large scale integrated circuit) power consumption in order to make a rough estimate of power consumption and an internal power ratio of an LSI chip at the beginning stage of a system LSI designing.

DESCRIPTION OF THE RELATED ART

In the conventional estimation system of LSI power consumption, at the case estimating the power consumption of a new designing LSI chip, a power model of a basic cell and a logic block using loads and frequencies as parameters are provided in advance, the HDL (hardware description language) is applied, the estimation of a mapping for its own model (such as adder, mutiplexe, etc.) and the kinds of gates by the HDL are implemented. The frequency of every internal node is estimated by the frequency applied to the outside, the internal wiring load is estimated by a calculation equation and the power consumption of the LSI chip is made a rough estimate by the above mentioned power model.

The Japanese Patent Laid-Open Application No. HEI 7-73232 discloses the estimation system of LSI power consumption using the HDL. This system extracts the RTL (resistor transistor logic) part or the description of functions from the HDL and the power consumption is estimated by this extracted circuit information.

As mentioned above, at the conventional estimation system of the LSI power consumption, the HDL is applied for the estimation of the power consumption of LSI.

However, at the estimation system using the HDL, at the case that the result of the estimation is exceeded the expectations, the specifications and designing of the LSI chip have to be changed. With this change, the description of the HDL has to be largely modified or a new HDL has to be provided and the power consumption is estimated again. Therefore, the power consumption is estimated at the every time of the change of the specification and the description of the HDL, the final estimation of the power consumption is not obtained until the state that the designing is almost completed and the description of the HDL is arranged without the contradiction of logic.

Furthermore, at the above mentioned estimation system of the power consumption of LSI used the HDL, the logic block and the power model of the basic cell have to be completely provided as a library for this estimation. Therefore, a large man power is required to complete the logic block and the power model of the basic cell, however, there are many cases that the newest logic block has not been provided yet. Under this situation, when the power consumption is estimated and the result is beyond the expectation, it is very difficult to change largely the specification and the designing of the LSI chip. Even though the all logic blocks are provided, the power is not able to be completely described in each step of the logic block, therefore the value of the estimated power has a large error range.

SUMMARY OF THE INVENTION

It is therefore an object of the present invention to provide an estimation system of LSI power consumption which is able to obtain the power consumption of an LSI chip and the contents in high accuracy at the beginning stage of the designing without using the HDL.

According to a first aspect of the present invention, to solve the above mentioned problems, an estimation system of LSI power consumption, at which estimates the power consumption of a new designing LSI chip, provides an I/O (input/output) part estimating section which estimates I/O part power of an LSI chip based on the outside specifications required by the application of the LSI chip, and a modifiable circuitry part estimating section which is given voltage, frequency, the number of gates, unit capacity and clock structure and refers to the data base of kinds of functions and estimates the size of a clock tree and estimates a new designing part power of said new designing LSI chip.

According to a second aspect of the present invention, an estimation system of LSI power consumption, at which estimates the power consumption of a new designing LSI chip having core circuitry, provides an I/O part estimating section which estimates I/O part power of an LSI chip based on the outside specifications required by the application of the LSI chip, a core circuitry part estimating section which calculates the core power of an original LSI chip becoming the origin of the core circuitry subtracting the I/O part power of the existing original LSI chip from the known total power of the original LSI chip and converts voltage, process and frequency from the core power of the original LSI chip to the core circuitry power of the new designing LSI chip and estimates the core circuitry power of the new designing LSI chip and a modifiable circuitry part estimating section which is given voltage, frequency, the number of gates, unit capacity and clock structure and refers to the data base of kinds of functions and estimates the size of a clock tree and estimates a modifiable circuitry part power of said new designing LSI chip.

According to a third aspect of the present invention, an estimation system of LSI power consumption, at which estimates the power consumption of a new designing LSI chip, provides an I/O part estimating section which estimates I/O part power of an LSI chip based on the outside specifications required by the application of the LSI chip, a data base of the ratio of each function which stores the ratio of the number of FF (flip-flop)/gates and the ratio of clock power/logic power in the kinds of functions, a modifiable circuitry part estimating section which calculates the ratio of the number of FF/gates and the ratio of clock power/logic power referring to said data base of the ratio of each function from the kinds of functions and calculates clock system power based on the ratio of the number of FF/gates, voltage, frequency, the number of gates, unit capacity and clock structure and calculates logic system power using the ratio of the clock/logic power and calculates modifiable circuitry part power summing up the clock system power and the logic system power, and an LSI chip power calculating section which calculates the power of the new designing LSI chip summing up the I/O part power calculated at said I/O part estimating section and the new designing part power calculated at said new designing part estimating section.

According to a fourth aspect of the present invention, an estimation system of LSI power consumption, at which estimates the power consumption of a new designing LSI chip having core circuitry, provides an I/O part estimating section which estimates I/O part power of said new designing LSI chip and I/O part power of the existing original LSI chip having the core of the same function that the core circuitry of said new designing LSI chip has, based on the outside specifications required by the application of the LSI chip, a data base of the ratio of each function which stores the ratio of the number of FF/gates and the ratio of clock power/logic power in the kinds of functions, a core circuitry part estimating section which calculates the core power of the original LSI chip subtracting said I/O part power of the original LSI chip calculated at said I/O part estimating section from the known total power of the original LSI chip and converts voltage, process and frequency from the core power of the original LSI chip to the core circuitry power of the new designing LSI chip and estimates the core circuitry power of the new designing LSI chip, a new designing part estimating section which calculates the ratio of the number of FF/gates and the ratio of clock power/logic power referring to said data base of the ratio of each function from the kinds of functions and calculates clock system power based on the ratio of the number of FF/gates, voltage, frequency, the number of gates, unit capacity and clock structure and calculates logic system power using the ratio of the clock/ logic power and calculates the modifiable circuitry part power summing up the clock system power and the logic system power, and an LSI chip power calculating section which calculates the power of the new designing LSI chip summing up the I/O part power calculated at said I/O part estimating section and the core circuitry power calculated at said core circuitry part estimating section and the modifiable circuitry part power calculated at said modifiable circuitry part estimating section.

According to a fifth aspect of the present invention, at an estimation system of LSI power consumption, said core circuitry part estimating section calculates the core circuitry power of said new designing LSI chip based on the core power of the original LSI chip converting voltage, process, frequency in the following equation, core circuitry power of new designing LSI chip=(voltage of new designing LSI chip/voltage of original LSI chip)$^2$×(minimum designing size of new designing LSI chip/minimum designing size of original LSI chip)$^2$×(frequency of new designing LSI chip/frequency of original LSI chip).

According to a sixth aspect of the present invention, at an estimation system of LSI power consumption, said core circuitry part estimating section estimates the core circuitry power regarding the kinds of macro and the number of macro using for the new designing LSI chip and estimates the core circuitry power of said new designing LSI chip summing up these core circuitry power.

According to a seventh aspect of the present invention, at an estimation system of LSI power consumption, said modifiable circuitry part estimating section provides the number of FF and the ratio of clock/logic estimating section which refers to said data base of the ratio of each function and calculates the ratio of the number of FF/gates and the ratio of clock power/logic power, a clock system power estimating section which calculates the number of FF multiplying calculated said ratio of the number of FF/gates by the number of gates and calculates the number of buffers with the number of FF and the clock structure and calculates the clock system power by the following equation, clock system power=(unit capacity of FF×number of FF+unit capacity of buffer×number of buffers)×voltage$^2$×frequency, and a logic system power estimating section which estimates the logic system power with said ratio of clock power/logic power calculated at said number of FF and the ratio of clock/logic estimating section, and said modifiable circuitry part estimating section sums up the clock system power and the logic system power.

According to a ninth aspect of the present invention, at an estimation system of LSI power consumption, said modifiable circuitry part estimating section, at the case that the modifiable circuitry part of the new designing LSI chip has clock frequencies of plural systems, estimates the clock system power in each clock frequency and estimates the clock power of the modifiable circuitry part summing up these plural clock system power.

According to a ninth aspect of the present invention, at an estimation system of LSI power consumption, said new designing part estimating section, at the case that the new designing part of the new designing LSI chip has clock frequencies of plural systems, estimates the clock system power in each clock frequency and estimates the clock power of the new designing part summing up these plural clock system power.

According to a tenth aspect of the present invention, at an estimation system of LSI power consumption, said I/O part estimating section estimates the I/O part power of the LSI chip by the following equation, I/O part power=load capacity×voltage$^2$×frequency×number of pins.

According to an eleventh aspect of the present invention, at an estimation system of LSI power consumption, said chip power calculating section calculates the internal power ratio of the LSI chip.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
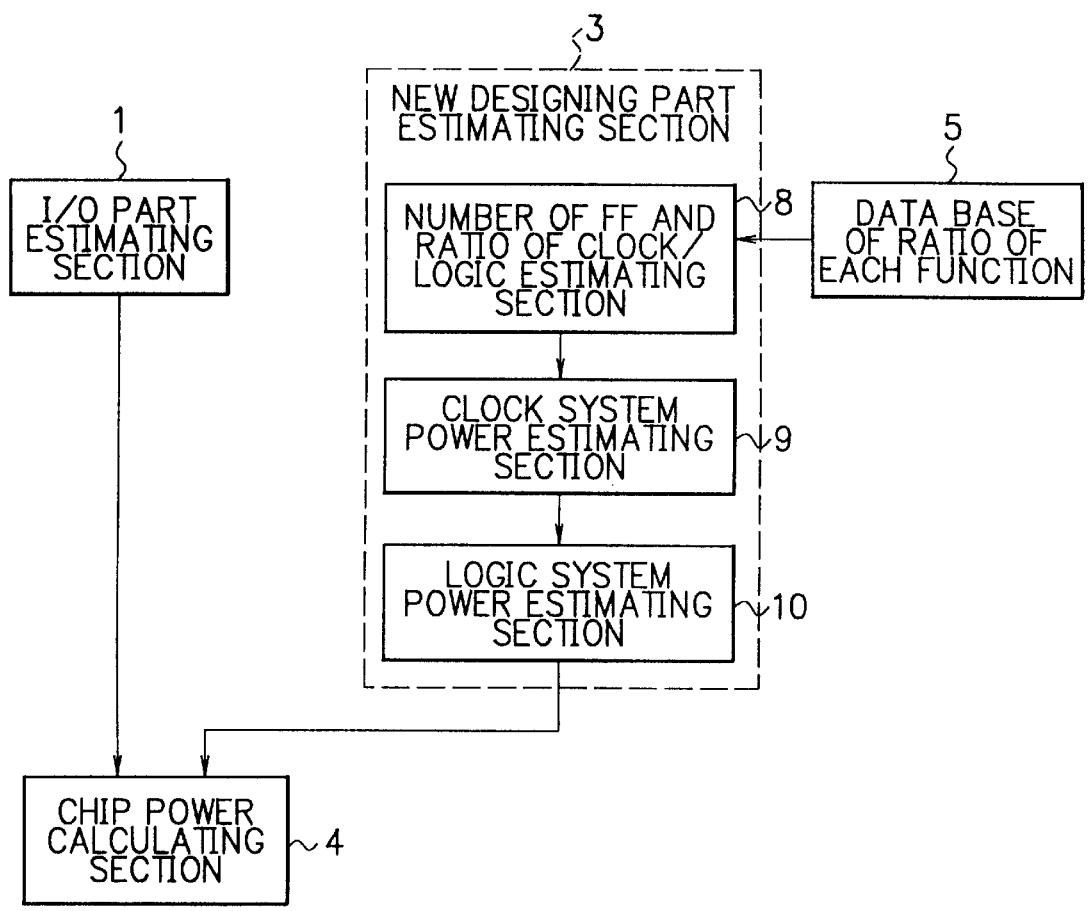
FIG. 1 is a block diagram showing an embodiment of the present invention.

Referring now to the drawings, embodiments of the present invention are explained in detail. FIG. 1 is a block diagram showing an embodiment of the present invention. An estimation system of LSI power consumption shown in FIG. 1 is constituted of an I/O (input/output) part estimating section 1 which estimates the I/O part power of the LSI chip, a modifiable circuitry part estimating section 3 which estimates the power of the modifiable circuitry part of the LSI chip, a chip power calculating section 4 which calculates a total power of the LSI chip and an internal power ratio and a data base of ratio of each function which stores the ratio of the number of FF (flip-flop)/gates and the ratio of the clock power/the logic power in the kinds of functions.

The modifiable circuitry part estimating section 3 provides the number of FF and the ratio of the clock/logic estimating section 8 which estimates the ratio of the number of FF/gates and the ratio of the clock power/the logic power referring to the data base of ratio of each function from the kinds of functions, a clock system power estimating section 9 which estimates the clock system power by estimating the size of a clock tree and a logic system power estimating section 10 which estimates the logic system power based on the ratio of the clock power/the logic power.

Figure 2:
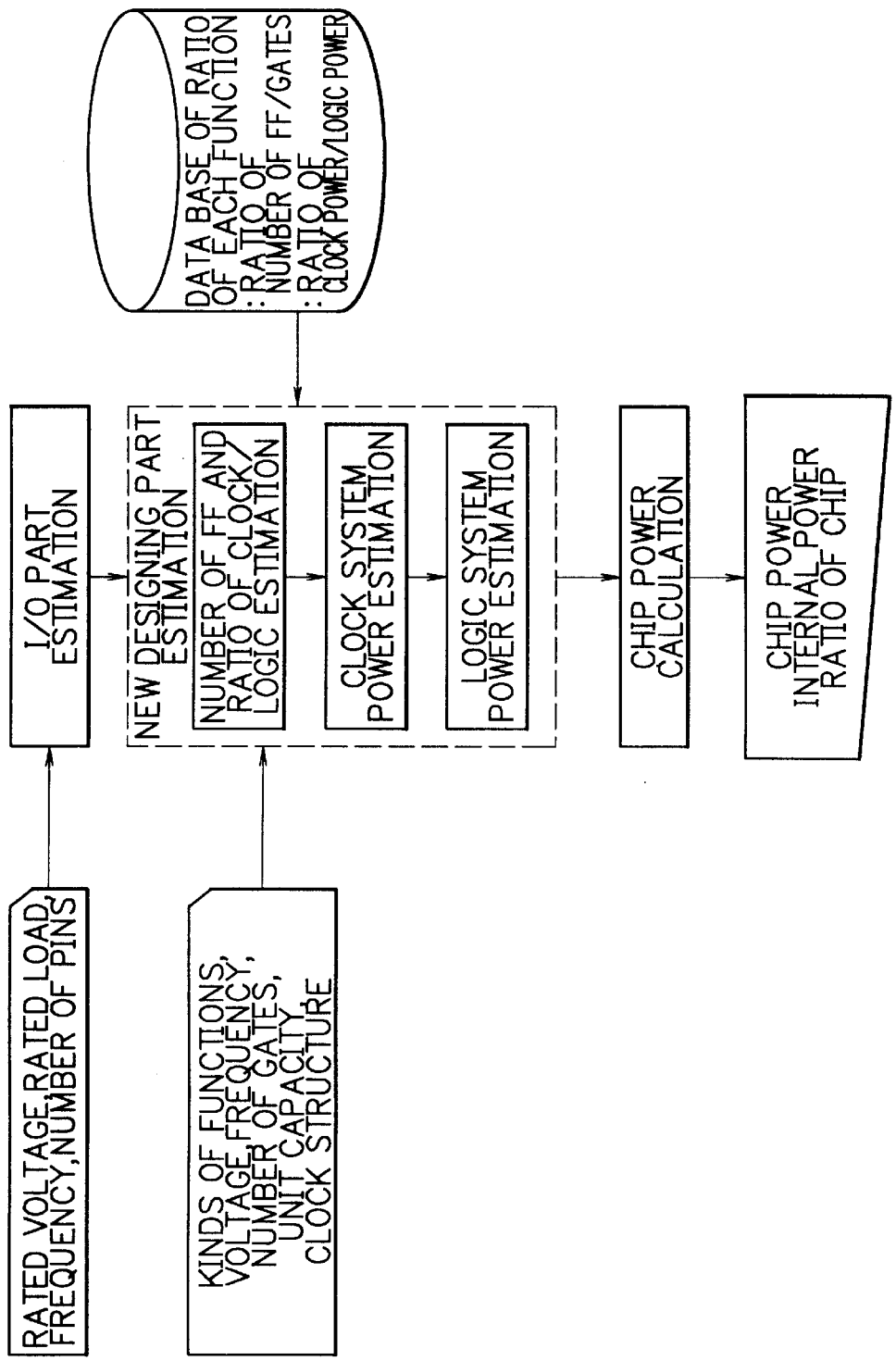
FIG. 2 is a total operating flow of the estimation system of the LSI power consumption shown in FIG. 1.

Next, the operation of the embodiment of the present invention is explained. FIG. 2 is a total operating flow of the estimation system of the LSI power consumption shown in FIG. 1.

At the I/O part estimation, the operating condition is able to be estimated as outside specifications of the LSI chip at the beginning stage, the I/O part power of the new designing LSI chip is estimated in the following equation given voltage V, load capacity, frequency F and the number of pins N.

$$\text{I/O part power} = \text{load capacity} \times V^2 \times F \times N$$

At the modifiable circuitry part estimation, at the first, the kinds of functions (general-purpose processor system, graphic system, network system, etc.), voltage, frequency, the number of gates, unit capacity (switching capacity of the basic gates of nand, buffer, FF, etc.) and clock structure (the number of fanouts of the buffer constituting the tree) of the modifiable circuitry part are given.

Next, the kind of functions is designated and the ratio of the number of FF/gates is obtained referring to the data base of ratio of each function. The number of FF is obtained by multiplying the ratio of the number of FF/gates by the number of gates. The number of FF is divided by the number of fanout of the buffer and further the result is divided by the number of fanout and this division is continued until the result reaches below 1. With this operation, the number of buffer of the clock tree is obtained. Then the clock system power is obtained by the following equation.

$$\text{Clock system power} = (\text{unit capacity of FF} \times \text{number of FF} + \text{unit capacity of buffer} \times \text{number of buffers}) \times V^2 \times F$$

Then, referring to the data base of ratio of each function from the kinds of functions, the ratio of the clock power/the logic power is obtained. The obtained clock system power is divided by the ratio of the clock power/the logic power and the logic system power is obtained. The total power of the modifiable circuitry part is the sum of the clock system power and the logic system power.

At the LSI chip power calculation, the power of the new designing LSI chip is obtained by adding the I/O part power obtained at the I/O part estimation and the modifiable circuitry part power obtained at the modifiable circuitry part estimation, or the internal power ratio of the new designing LSI chip is obtained.

Figure 3:
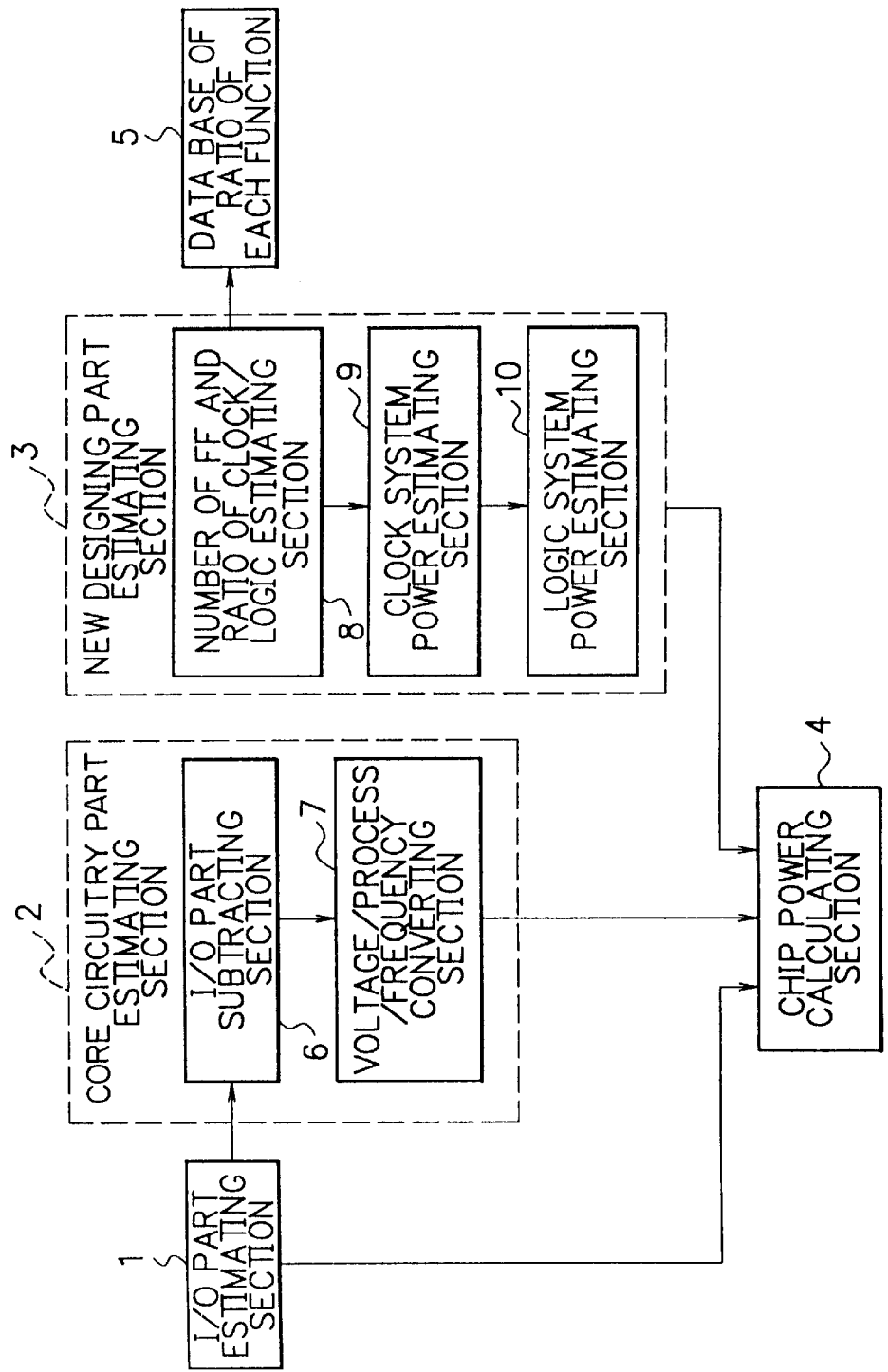
FIG. 3 is a block diagram showing an embodiment of the estimation system of LSI power consumption at the case that the new designing LSI chip has core circuitry.

FIG. 3 is a block diagram showing an embodiment of the estimation system of LSI power consumption at the case that the new designing LSI chip has core circuitry.

The estimation system of LSI power consumption shown in FIG. 3 is constituted of an I/O part estimating section 1 which estimates the power of I/O part of the LSI chip, a core circuitry part estimating section 2 which estimates the core circuitry power of the LSI chip, a modifiable circuitry part estimating section 3 which estimates the power of the modifiable circuitry part of the LSI chip, a chip power calculating section 4 which calculates a total power of the LSI chip and an internal power ratio and a data base of ratio of each function which stores the ratio of the number of FF/gates and the ratio of the clock power/the logic power in the kinds of functions. That the core circuitry part estimating section 2 is added to the estimation system of the LSI power consumption shown in FIG. 1 is the estimation system of the LSI power consumption shown in FIG. 3.

The core circuitry estimating section 2 provides an I/O part subtracting section 6 which calculates a core power subtracting the I/O part power of an original LSI chip obtained at the I/O part estimating section 1 from the known power of the original LSI chip and a voltage/process/frequency converting section 7 which converts the voltage/process/frequency from the core power of the original LSI chip to the core circuitry power of the new designing LSI chip.

Figure 4:
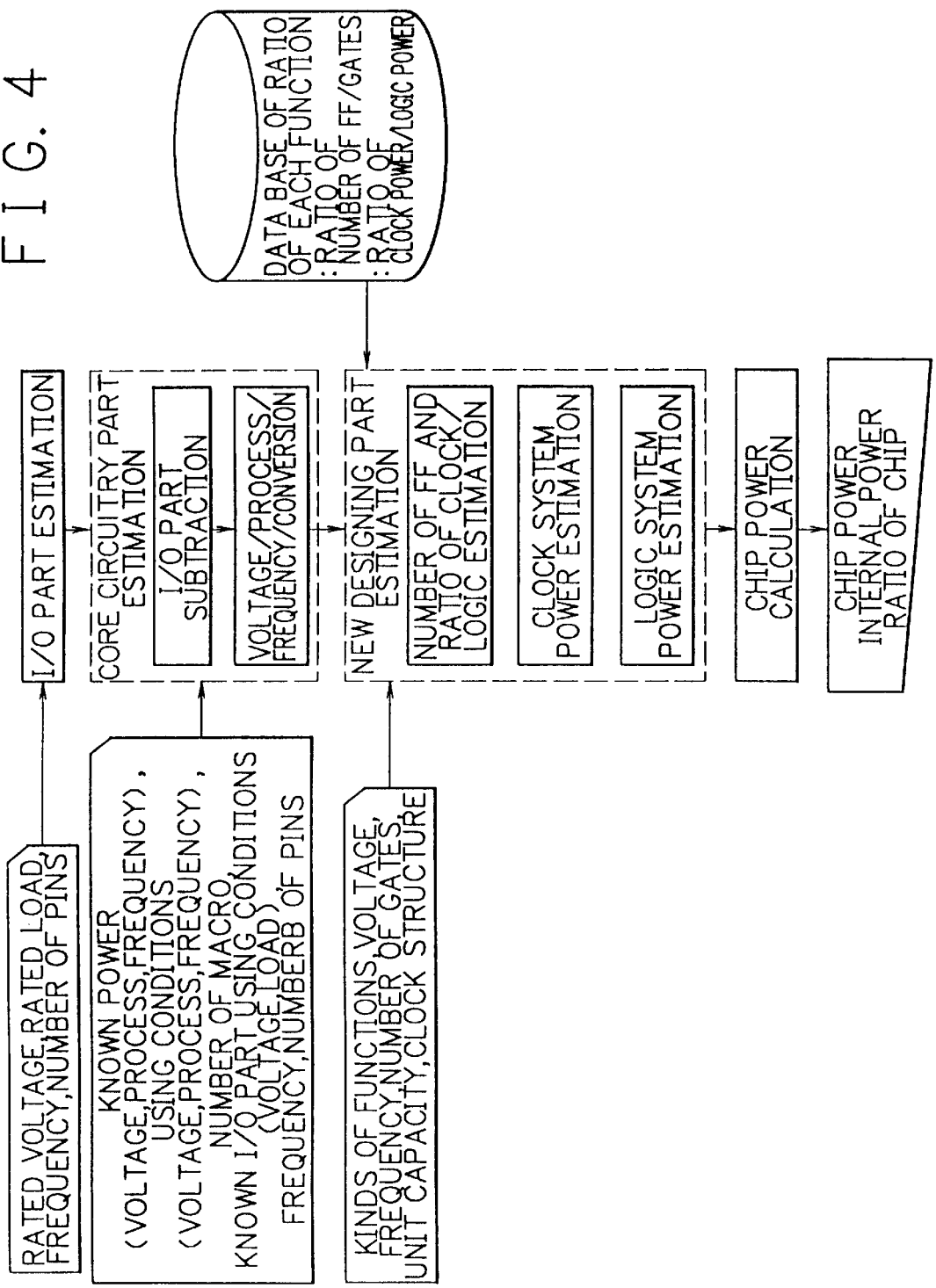
FIG. 4 is a total operating flow of the estimation system of the LSI power consumption at the case that the new designing LSI chip has core circuitry shown in FIG. 3.

FIG. 4 is a total operating flow of the estimation system of the LSI power consumption at the case that the new designing LSI chip has core circuitry shown in FIG. 3. The operation of the I/O part estimation and the modifiable circuitry part estimation is the same as the operation stated in FIG. 2.

At the core circuitry part estimation, first the I/O part power of the original LSI chip which has internally the core of the same function that the core circuitry of the new designing LSI chip has is calculated. As the same as the above mentioned power calculation of the I/O part, this I/O part power is able to be calculated by the outside specifications. Next, as the power of the original LSI chip is known, the core power of the original LSI chip, that is the power excluded the power of the I/O part, is calculated subtracting the I/O part power of the original LSI chip from the known power of the original LSI chip.

Next, at the voltage/process/frequency conversion, this conversion is implemented, and the power consumption of the core circuitry of the new designing LSI chip is calculated. In this conversion, the switching power of CMOS is calculated by an equation, $P = cv^2 f$, therefore the change of voltage is reflected by the second power, the change of the process is only the change of size simply, the capacity itself is reflected by the second power of the minimum designing rule and the frequency is simply converted proportionally.

The above mentioned conversion is implemented in the number of the kinds of macro (m1, m2, . . . ) and the number of macro (nm1, nm2, . . . ) used in the designing and the power of the core circuitry is calculated by summing up all the result of the conversion.

At the LSI chip power calculation, the power of the new designing LSI chip is calculated by summing up the I/O part power estimated at the I/O part estimation and the core circuitry power estimated at the core circuitry estimation and the modifiable circuitry part power estimated at the modifiable circuitry part estimation, or the internal power ratio of the new designing LSI chip is calculated.

An example of the embodiment of the estimation system of the LSI power consumption at the case that the new designing LSI chip has core circuitry is explained in detail.

As an example, the following specifications of a new designing LSI chip is given and the number of core circuitry for this new designing LSI chip is only one in this case.

The specifications of the I/O part of this new designing LSI chip are as follows:

| No. | voltage(V) V | load(pF) C | frequency(MHz) F | number of pins N |
|-----|---|---|---|---|
| 1 | 3.3 | 30 | 25 | 10 |
| 2 | 3.3 | 30 | 5 | 50 |
| 3 | 3.3 | 20 | 1 | 70 |

In this example, the number of conditions is stated in 3, however the number of conditions is not limited to 3, 4 or more conditions are applicable depending on the designing.

The specifications of the core circuitry of the new designing LSI chip:
voltage: 2.5 V
frequency: 30 MHz
manufacturing process: 0.25 $\mu$m The specifications of the modifiable circuitry part of the new designing LSI chip:
kind of functions: graphic
voltage: 2.5 V
frequency: 50 MHz
number of gates: 100000 gates
unit capacity (buffer): 0.2 pF
unit capacity (FF): 0.1 pF
clock structure: tree fanout=4

As the data base of the ratio of each function, following data are provided:

|  | number of FF/gate | clock power/ logic power |
|---|---|---|
| high-end microprocessor | 0.2 | 1.1 |
| low-end microprocessor | 0.2 | 1.2 |
| graphic | 0.2 | 0.6 |
| network | 0.4 | 1.8 |

And at the case, that the specifications of the original LSI chip which has the core of the same function that the core circuitry of the new designing LSI chip has are as follows:
actually measured power: 1.5 W
voltage: 3.3 V
frequency: 50 MHz
manufacturing process: 0.35 $\mu$m The specifications of the I/O part of the original LSI chip are as follows:

| No. | voltage(v) V | load(pF) C | frequency(MHz) F | number of pins N |
|-----|---|---|---|---|
| 1 | 3.3 | 20 | 25 | 10 |
| 2 | 3.3 | 20 | 5 | 30 |
| 3 | 3.3 | 20 | 1 | 30 |

In this example, the number of conditions is stated in 3, however the number of conditions is not limited to 3, 4 or more conditions are applicable depending on the designing.

With these data, the power of the new designing LSI chip Pnew is estimated.

Figure 5:
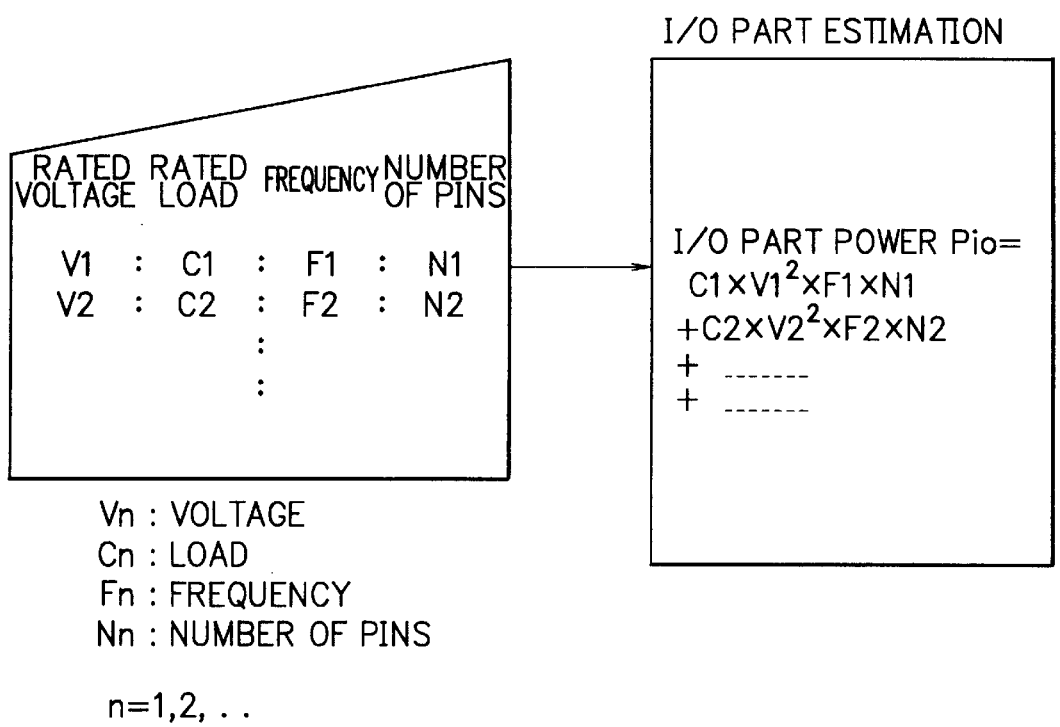
FIG. 5 is a diagram showing an equation in order to calculate the I/O part power of the LSI chip at the I/O part estimation.

FIG. 5 is a diagram showing an equation in order to calculate the I/O part power of the LSI chip at the I/O part estimation.

At the I/O part estimation, at the case that the data are:
voltage V1: 3.3 V
load C1: 30 pF
frequency F1: 25 MHz
number of pins N1: 10 Power is calculated by the following equation:

$$Power = C1 \times V1^2 \times F1 \times N1$$
$$= 30 \times 10^{-12} \times 3.3^2 \times 25 \times 10^6 \times 10$$
$$= 0.082 \text{ W}.$$

By the same calculation for the remaining pins, summing up all power, the I/O part power of the new designing LSI chip Pio becomes 0.18 W.

Figure 6:
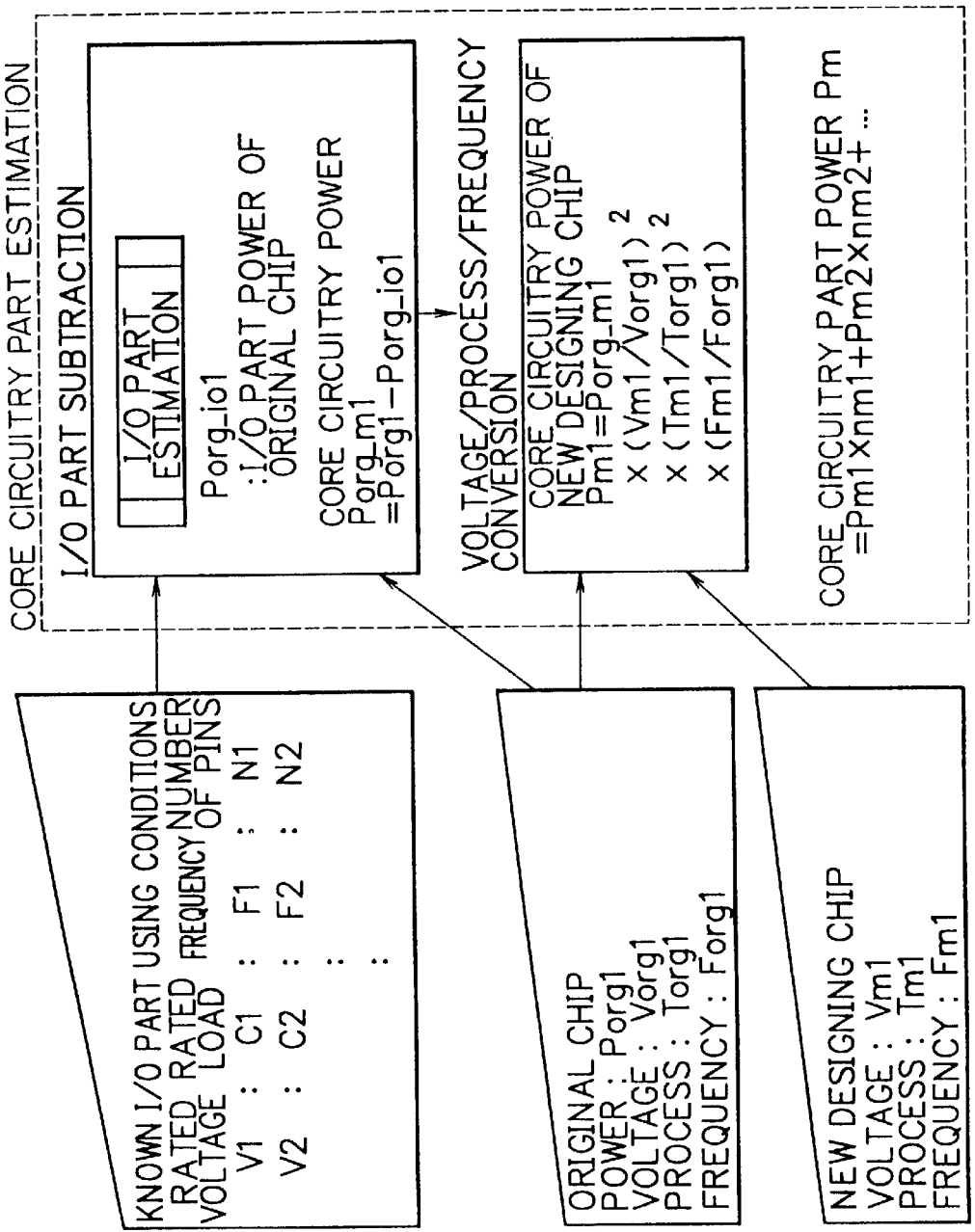
FIG. 6 is a diagram showing an equation and a method in order to calculate the core circuitry power of the LSI chip at the core circuitry part estimation.

FIG. 6 is a diagram showing an equation and a method in order to calculate the core circuitry power of the LSI chip at the core circuitry part estimation.

At the core circuitry part estimation, in the I/O part subtraction, the core power of the original LSI chip Porg__ml is calculated by subtracting the I/O part power of the original LSI chip Porg__io estimated at I/O part estimation from the total power of the original LSI chip Porg=1.5 W.

The I/O part power of the original LSI chip Porg__io is calculated by the same estimation as the above mentioned I/O part power estimation of the new designing LSI chip with the specifications of the I/O part of the original LSI chip, Porg__io=0.09 W is calculated. Therefore, the core power of the original LSI chip Porg__ml is, $$\text{Porg\_m1} = Porg - \text{Porg\_io}$$
$$= 1.5 - 0.09$$
$$= 1.41 \text{ W}.$$

Next, the core circuitry power consumption of the new designing LSI chip is calculated by the conversion of the respective items at the voltage/process/frequency conversion.

The specifications of the original LSI chip are as follows:
voltage Vorg 1=3.3 V
frequency Forg 1=50 MHz
manufacturing process Torg 1=0.35 $\mu$m.

The specifications of the new designing LSI chip are as follows:
voltage Vm 1=2.5 V
frequency Fm 1=30 MHz
manufacturing process Tm 1=0.25 $\mu$m.

By converting these data, the core circuitry power Pm of the new designing LSI chip is calculated by the following equation:

$$Pm = \text{Porg\_m} 1 \times (Vm\ 1/Vorg\ 1)^2 \times (Tm\ 1/Torg\ 1)^2 \times$$
$$(Fm\ 1/Forg\ 1)$$
$$= 1.41 \times (2.5/33)^2 \times (0.25/0.35)^2 \times (30/50)$$
$$= 0.25 \text{ W}$$

the value of Pm is calculated.

Figure 7:
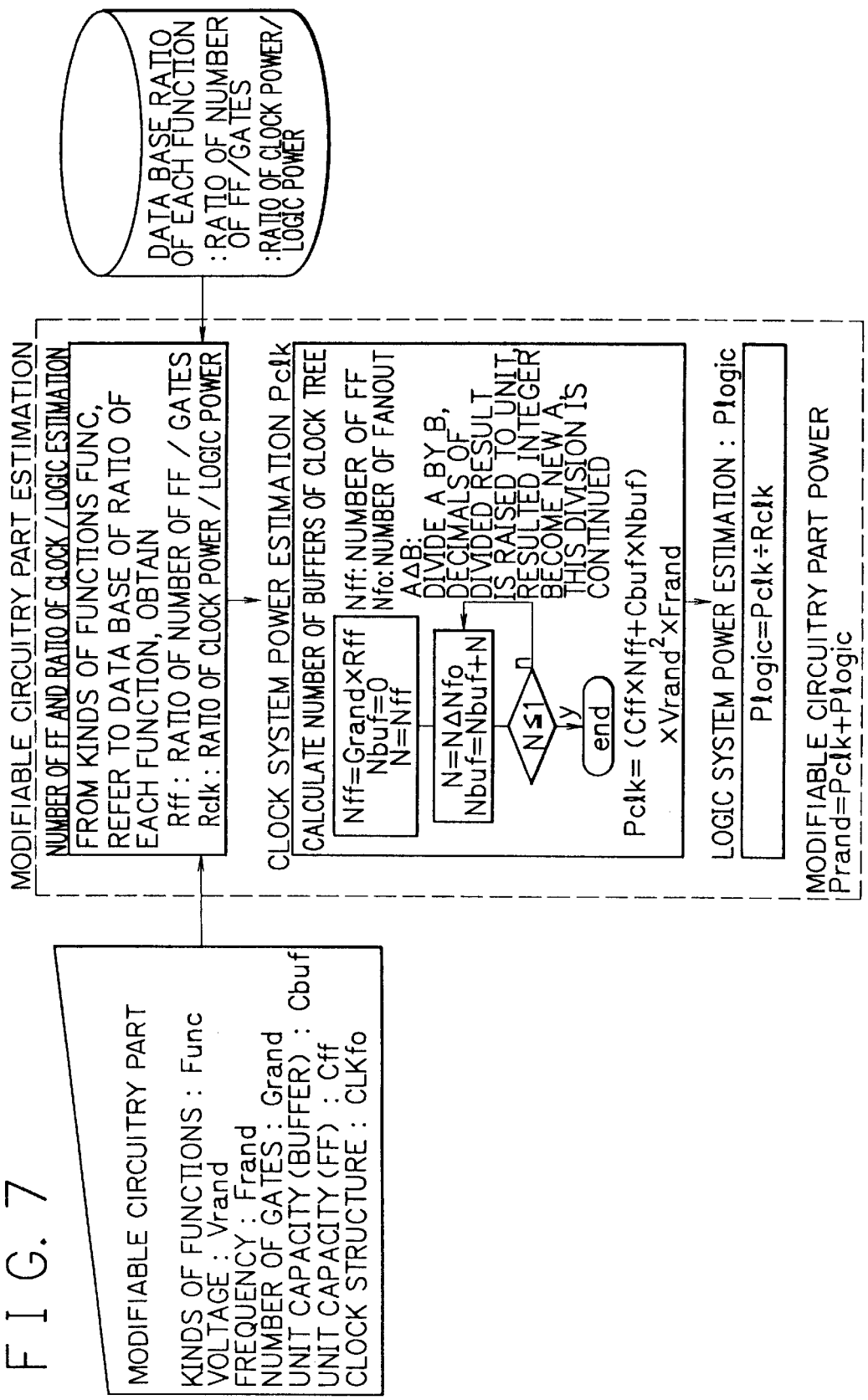
FIG. 7 is a diagram showing an equation and a method in order to calculate the modifiable circuitry part power at the modifiable circuitry part estimation.

FIG. 7 is a diagram showing an equation and a method in order to calculate the modifiable circuitry part power at the modifiable circuitry part estimation. At the new designing part estimation, first, in the estimation of the number of FF and the ratio of clock/logic, the ratio data base of each function is referred from the kinds of functions of the new designing part, for example the graphic system is a kind of functions.

Referring to this, the ratio of the number of FF/gates Rff=0.2
the ratio of the clock power/the logic power Rclk=0.6 are obtained.

At the clock system power estimation Pclk, first, the number of FF Nff is obtained from the number of gates Grand=100000. Nff is calculated by the following equation:

$$Nff = Grand \times Rff$$
$$= 100000 \times 0.2$$
$$= 20000$$

Next, the number of buffers of the clock tree which supplies clock to this Nff=20000 is calculated. The number of fanout of the buffer applying for the clock tree is 4, therefore the number of buffers of the clock tree is calculated by dividing the number of elements becoming the output of the buffer by this number of fanout continuously.

Now, "A Δ B" is defined as follows:
A is divided by B, the decimals of the divided result is raised to a unit, the resulted integer becomes a new A.

The number of elements at the end of the clock tree is the number of FF, therefore making the first A Nff=20000 and B=4, making the calculated result a new A, this calculation is continued. The calculation is continued as follows:
20000 Δ4=5000
5000 Δ4=1250
1250 Δ4=313
313 Δ4=79
79 Δ4=20
20 Δ4=5
5 Δ4=2
2 Δ4=1 summing up the right side results, the number of buffers Nbuf=6670 is obtained. Using with this figure and the following conditions, voltage Vrand=2.5 V
frequency Frand=50 MHz
unit capacity (buffer) Cbuf=0.2 pF
unit capacity (FF) Cff=0.1 pF $$Pclk = (Cff \times Nff + Cbuf \times Nbuf) \times Vrand^2 \times Frand$$
$$= (0.1 \times 10^{-12} \times 20000 + 0.2 \times 10^{-12} \times 6670) \times 2.5^2 \times 50 \times 10^6$$
$$= 1.04\ W.$$

the clock system power Pclk is obtained.

The logic system power Plogic is calculated by the following equation.

$$Plogic = Pclk \div Rclk$$
$$= 1.04 \div 0.6$$
$$= 1.73\ W$$

With this calculation, the modifiable circuitry part power Prand is calculated by the following equation.

$$Prand = Pclk + Plogic$$
$$= 1.04 + 1.73$$
$$= 2.77\ W$$

At the LSI chip power calculation, with above mentioned result, the new designing LSI chip power Pnew is calculated by the following equation.

$$Pnew = Pio + Pm + Prand$$
$$= 0.18 + 0.25 + 2.77$$
$$= 3.20\ W.$$

And the internal power ratio of the new designing LSI chip is calculated as follows:

|  | power (W) | ratio (%) |
| --- | --- | --- |
| I/O part power | 0.18 | 5 |
| hard macro power | 0.25 | 8 |
| clock system power | 1.04 | 33 |
| logic system power | 1.73 | 54 |
| total | 3.20 | 100 |

With the above mentioned calculation, this embodiment is able to calculate the LSI chip power consumption and the internal power ratio of the LSI chip.

Next, the calculation method to calculate the modifiable circuitry part power corresponding to clock frequencies of plural systems is explained. In this case, a user designates the clock frequencies and the ratio of the number of FF connecting to the clock frequencies as specifications of the modifiable circuitry part, as in the following example. The other specifications are the same as the above mentioned example.

The specifications of the modifiable circuitry part are as follows:
kind of functions: graphic
voltage: 2.5 V
frequencies: 50 MHz (30%), 30 MHz (70%)
number of gates: 100000 gates
unit capacity (buffer): 0.2 pF
unit capacity (FF): 0.1 pF
clock structure: tree fanout=4.

First, at the clock system power (Pclk) estimation, the number of FF Nff is calculated. The calculation method is the same as the above mentioned example.

$$Nff = Grand \times Rff$$
$$= 100000 \times 0.2$$
$$= 20000$$

Next, with this Nff=20000 and the above mentioned specifications, the number of FF for 50 MHz system $Nff_{50}$ and the number of FF for 30 MHz system $Nff_{30}$ are calculated.

$$Nff_{50} = Nff \times 0.30$$
$$= 20000 \times 0.30$$
$$= 6000$$
$$Nff_{30} = Nff \times 0.70$$
$$= 20000 \times 0.70$$
$$= 14000.$$

After the number of FF $Nff_{50}$ and $Nff_{30}$ are calculated, the number of buffers of clock tree is calculated corresponding to the respective frequencies and the clock system power is calculated by the same method as the above mentioned example.

The total clock system power is calculated by summing up the clock system power of the respective frequencies and the logic system power is calculated by the same calculation method as the above mentioned example.

At the present invention, the I/O part power is estimated by the actual load and frequency, and the core circuitry part power is roughly estimated by the known actual operating power, these two part power are able to be calculated in high accuracy. The power ratio of the clock power/the logic power depending on the function of the LSI chip is shown in the range between 0.5 and 2 from the various examples. Moreover, the estimation of power is implemented by estimating the structure of the clock tree, therefore, at the modifiable circuitry part, the clock system power being the big power element and main part is able to be calculated in high accuracy. The data base of the ratio of the clock power/the logic power are able to have the higher accuracy by continuing the feedback of the data from the actually measured values.

As explained above, the present invention is able to estimate the power consumption using with the outside specifications required by the application of the LSI chip and the data base of the ratio of each function, without using the HDL.

Therefore, at the beginning stage of the designing being that the HDL has not been completed, the LSI chip power and the internal power ratio are able to be calculated. Moreover, as stated above, the LSI chip power is able to be estimated in high accuracy. Accordingly, the present invention is able to have the effect that the designing specification is able to be reconsidered at the beginning stage and the suitable power planning for the following processes is able to be implemented.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An estimation system of LSI power consumption, at which estimates the power consumption of a new LSI chip, comprising:

an I/O part estimating section which estimates I/O part power of an LSI chip based on the outside specifications required by the application of the LSI chip;

a data base of the ratio of each function which stores the ratio of the number of FF (flip-flop)/gates and the ratio of clock power/logic power;

a modifiable circuitry part estimating section which calculates the ratio of the number of FF/gates and the ratio of clock power/logic power referring to said data base of the ratio of each function from the kinds of functions and calculates clock system power based on the ratio of the number of FF/gates, voltage, frequency, the number of gates, unit capacity and clock structure and calculates logic system power using the ratio of the clock/logic power and calculates modifiable circuitry part power summing up the clock system power and the logic system power; and an LSI chip power calculating section which calculates the power of the new designing LSI chip summing up the I/O part power calculated at said I/O part estimating section and the modifiable circuitry part power calculated at said modifiable circuitry part estimating section.

2. An estimation system of LSI power consumption, at which estimates the power consumption of a new designing LSI chip having core circuitry, comprising:

an I/O part estimating section which estimates I/O part power of said new designing LSI chip and I/O part power of the existing original LSI chip having the core of the same function that the core circuitry of said new designing LSI chip has, based on the outside specifications required by the application of the LSI chip;

a data base of the ratio of each function which stores the ratio of the number of FF/gates and the ratio of clock power/logic power in the kinds of functions;

a core circuitry part estimating section which calculates the core power of the original LSI chip subtracting said I/O part power of the original LSI chip calculated at said I/O part estimating section from the known total power of the original LSI chip and converts voltage, process and frequency from the core power of the original LSI chip to the core circuitry power of the new designing LSI chip and estimates the core circuitry power of the new designing LSI chip;

a modifiable circuitry part estimating section which calculates the ratio of the number of FF/gates and the ratio of clock power/logic power referring to said data base of the ratio of each function from the kinds of functions and calculates clock system power based on the ratio of the number of FF (flip-flop)/gates, voltage, frequency, the number of gates, unit capacity and clock structure and calculates logic system power using the ratio of the clock/logic power and calculates the modifiable circuitry part power summing up the clock system power and the logic system power; and an LSI chip power calculating section which calculates the power of the new designing LSI chip summing up the I/O part power calculated at said I/O part estimating section and the core circuitry power calculated at said core circuitry part estimating section and the modifiable circuitry part power calculated at said modifiable circuitry part estimating section.

3. An estimation system of LSI power consumption in accordance with claim 2, wherein:

said core circuitry part estimating section calculates the core circuitry power of said new designing LSI chip based on the core power of the original LSI chip converting voltage, process, frequency in the following equation, core circuitry power of new designing LSI chip=(voltage of new designing LSI chip/voltage of original LSI chip)$^2 \times$(minimum designing size of new designing LSI chip/minimum designing size of original LSI chip)$^2 \times$(frequency of new designing LSI chip/frequency of original LSI chip).

4. An estimation system of LSI power consumption in accordance with claim 2, wherein:
said core circuitry part estimating section estimates the core circuitry power regarding the kinds of core circuitry and the number of core circuits used in the new LSI chip and estimates the core circuitry power of said new LSI chip summing up the core circuitry power.

5. An estimation system of LSI power consumption in accordance with claim 3, wherein:
said core circuitry part estimating section estimates the core circuitry power regarding the kinds of core circuitry and the number of core circuits used in the new LSI chip and estimates the core circuitry power of said new LSI chip summing up the core circuitry power.

6. An estimation system of LSI power consumption in accordance with claim 1, wherein:
said modifiable circuitry part estimating section, comprising:
the number of FF and the ratio of clock/logic estimating section which refers to said data base of the ratio of each function and calculates the ratio of the number of FF/gates and the ratio of clock power/logic power;
a clock system power estimating section which calculates the number of FF multiplying calculated said ratio of the number of FF/gates by the number of gates and calculates the number of buffers with the number of FF and the clock structure and calculates the clock system power by the following equation, clock system power=(unit capacity of FF×number of FF+unit capacity of buffer×number of buffers)×voltage²×frequency;

and
a logic system power estimating section which estimates the logic system power with said ratio of clock power/logic power calculated at said number of FF and the ratio of clock/logic estimating section,
and said modifiable circuitry part estimating section sums up the clock system power and the logic system power.

7. An estimation system of LSI power consumption in accordance with claim 6, wherein:
said number of buffers of the clock tree is calculated by the following operation, first said number of FF is divided by the number of fanout and the divided result is divided by the number of fanout and this dividing is continued until the result becomes less than 1.

8. An estimation system of LSI power consumption in accordance with claim 1, wherein:
said modifiable circuitry part estimating section, at the case that the new designing part of the new designing LSI chip has clock frequencies of plural systems, estimates the clock system power in each clock frequency and estimates the clock power of the modifiable circuitry part summing up these plural clock system power.

9. An estimation system of LSI power consumption in accordance with claim 1, wherein:
said I/O part estimating section estimates the I/O part power of the LSI chip by the following equation, I/O part power=load capacity×voltage²×frequency×number of pins.

10. An estimation system of LSI power consumption in accordance with claim 1, wherein:
said chip power calculating section calculates the internal power ratio of the LSI chip.

11. An estimation method of LSI power consumption, at which estimates the power consumption of a new LSI chip, comprising:
an I/O part estimating method which estimates I/O part power of an LSI chip based on the outside specifications required by the application of the LSI chip;
a modifiable circuitry part estimating method which obtains the ratio of the number of FF/gates and the ratio of clock power/logic power referring to the data base of the ratio of each function which stores the ratio of the number of FF/gates and the ratio of clock power/logic power in the kinds of functions and calculates clock system power based on the ratio of the number of FF/gates, voltage, frequency, the number of gates, unit capacity and clock structure and calculates logic system power using the ratio of the clock/logic power and calculates modifiable circuitry part power summing up the clock system power and the logic system power; and
an LSI chip power calculating method which calculates the power of the new LSI chip summing up the I/O part power calculated at said I/O part estimating method and the modifiable circuitry part power calculated at said modifiable circuitry part estimating method.

12. An estimation method of LSI power consumption, at which estimates the power consumption of a new LSI chip having core circuitry, comprising:
an I/O part estimating method which estimates I/O part power of said new LSI chip and I/O part power of the existing original LSI chip having the core of the same function that the core circuitry of said new LSI chip has, based on the outside specifications required by the application of the LSI chip;
a core circuitry part estimating method which calculates the core power of the original LSI chip subtracting said I/O part power of the original LSI chip calculated at said I/O part estimating method from the known total power of the original LSI chip and converts voltage, process and frequency from the core power of the original LSI chip to the core circuitry power of the new LSI chip and estimates the core circuitry power of the new LSI chip;
a modifiable circuitry part estimating method which obtains the ratio of the number of FF/gates and the ratio of clock power/logic power referring to the data base of the ratio of each function which stores the ratio of the number of FF/gates and the ratio of clock power/logic power in the kinds of functions and calculates clock system power based on the ratio of the number of FF/gates, voltage, frequency, the number of gates, unit capacity and clock structure and calculates logic system power using the ratio of the clock/logic power and calculates the modifiable circuitry part power summing up the clock system power and the logic system power; and
an LSI chip power calculating method which calculates the power of the new LSI chip summing up the I/O part power calculated at said I/O part estimating method and the core circuitry power calculated at said core circuitry part estimating method and the modifiable circuitry part power calculated at said modifiable circuitry part estimating method.

13. An estimation method of LSI power consumption in accordance with claim 12, wherein:
said core circuitry part estimating method calculates the core circuitry power of said new LSI chip based on the core power of the original LSI chip converting voltage, process, frequency in the following equation, core circuitry power of new designing LSI chip=(voltage of new LSI chip/voltage of original LSI chip)$^2$×(minimum designing size of new LSI chip/minimum designing size of original LSI chip)$^2$×(frequency of new LSI chip/frequency of original LSI chip).

14. An estimation method of LSI power consumption in accordance with claim 12, wherein:

said core circuitry part estimating method estimates the core circuitry power regarding the kinds of core circuitry and the number of core circuits used in the new LSI chip and estimates the core circuitry power of said new LSI chip summing up the core circuitry power.

15. An estimation method of LSI power consumption in accordance with claim 13, wherein:

said core circuitry part estimating method estimates the core circuitry power regarding the kinds of core circuitry and the number of core circuits used in the new LSI chip and estimates the core circuitry power of said new LSI chip summing up the core circuitry power.

16. An estimation method of LSI power consumption in accordance with claim 11, wherein:

said modifiable circuitry part estimating method, comprising:

the number of FF and the ratio of clock/logic estimating method which refers to said data base of the ratio of each function which stores the ratio of the number of FF/gates and the ratio of clock power/logic power in the kinds of functions and calculates the ratio of the number of FF/gates and the ratio of clock power/logic power;

a clock system power estimating method which calculates the number of FF multiplying calculated said ratio of the number of FF/gates by the number of gates and calculates the number of buffers with the number of FF and the clock structure and calculates the clock system power by the following equation, clock system power=(unit capacity of FF×number of FF+unit capacity of buffer×number of buffers)×voltage$^2$×frequency;

and a logic system power estimating method which estimates the logic system power with said ratio of clock power/logic power calculated at said number of FF and the ratio of clock/logic estimating method, and said modifiable circuitry part estimating method sums up the clock system power and the logic system power.

17. An estimation method of LSI power consumption in accordance with claim 16, wherein:

said number of buffers of the clock tree is calculated by the following operation, first said number of FF is divided by the number of fanout and the divided result is divided by the number of fanout and this dividing is continued until the result becomes less than 1.

18. An estimation method of LSI power consumption in accordance with claim 11, wherein:

said modifiable circuitry part estimating method, at the case that the modifiable circuitry part of the new LSI chip has clock frequencies of plural systems, estimates the clock system power in each clock frequency and estimates the clock power of the modifiable circuitry part summing up these plural clock system power.

19. An estimation method of LSI power consumption in accordance with claim 11, wherein:

said I/O part estimating method estimates the I/O part power of the LSI chip by the following equation, I/O part power=load capacity$^2$×voltage×frequency×number of pins.

20. An estimation method of LSI power consumption in accordance with claim 11, wherein:

said chip power calculating method calculates the internal power ratio of the LSI chip.

21. Recording media recording programs to implement an estimation of LSI power consumption, comprising:

an I/O part estimation program which estimates I/O part power of an LSI chip based on the outside specifications required by the application of the LSI chip;

a modifiable circuitry part estimation program which obtains the ratio of the number of FF/gates and the ratio of clock power/logic power referring to the data base of the ratio of each function which stores the ratio of the number of FF/gates and the ratio of clock power/logic power in the kinds of functions and calculates clock system power based on the ratio of the number of FF/gates, voltage, frequency, the number of gates, unit capacity and clock structure and calculates logic system power using the ratio of the clock/logic power and calculates modifiable circuitry part power summing up the clock system power and the logic system power; and an LSI chip power calculation program which calculates the power of the new LSI chip summing up the I/O part power calculated at said I/O part estimation program and the modifiable circuitry part power calculated at said modifiable circuitry part estimation program.

22. Recording media recording programs to implement an estimation of LSI power consumption, comprising:

an I/O part estimation program which estimates I/O part power of said new LSI chip and I/O part power of the existing original LSI chip having the core of the same function that the core circuitry of said new LSI chip has, based on the outside specifications required by the application of the LSI chip;

a core circuitry part estimation program which calculates the core power of the original LSI chip subtracting said I/O part power of the original LSI chip calculated at said I/O part estimation program from the known total power of the original LSI chip and converts voltage, process and frequency from the core power of the original LSI chip to the core circuitry power of the new LSI chip and estimates the core circuitry power of the new LSI chip;

a modifiable circuitry part estimation program which obtains the ratio of the number of FF/gates and the ratio of clock power/logic power referring to the data base of the ratio of each function which stores the ratio of the number of FF/gates and the ratio of clock power/logic power in the kinds of functions and calculates clock system power based on the ratio of the number of FF/gates, voltage, frequency, the number of gates, unit capacity and clock structure and calculates logic system power using the ratio of the clock/logic power and calculates the modifiable circuitry part power summing up the clock system power and the logic system power; and an LSI chip power calculation program which calculates the power of the new LSI chip summing up the I/O part power calculated at said I/O part estimation program and the core circuitry power calculated at said core circuitry part estimation program and the modifiable circuitry part power calculated at said modifiable circuitry part estimation program.

23. Recording media in accordance with claim 22, wherein:

said core circuitry part estimation program calculates the core circuitry power of said new LSI chip based on the core power of the original LSI chip converting voltage, process, frequency in the following equation, core circuitry power of new LSI chip=(voltage of new LSI chip/voltage of original LSI chip)²×(minimum designing size of new LSI chip/minimum designing size of original LSI chip)²×(frequency of new LSI chip/frequency of original LSI chip).

24. Recording media in accordance with claim 22, wherein:

said core circuitry part estimation program estimates the core circuitry power regarding the kinds of core circuitry and the number of core circuits used in the new LSI chip and estimates the core circuitry power of said new LSI chip summing up the core circuitry power.

25. Recording media in accordance with claim 23, wherein:

said core circuitry part estimation program estimates the core circuitry power regarding the kinds of core circuitry and the number of core circuits used in the new LSI chip and estimates the core circuitry power of said new LSI chip summing up the core circuitry power.

26. Recording media in accordance with claim 21, wherein:

said modifiable circuitry part estimation program, comprising:

the number of FF and the ratio of clockflogic estimation program which refers to said data base of the ratio of each function which stores the ratio of the number of FF/gates and the ratio of clock power/logic power in the kinds of functions and calculates the ratio of the number of FF/gates and the ratio of clock power/logic power;

a clock system power estimation program which calculates the number of FF multiplying calculated said ratio of the number of FF/gates by the number of gates and calculates the number of buffers with the number of FF and the clock structure and calculates the clock system power by the following equation, clock system power=(unit capacity of FF×number of FF+unit capacity of buffer×number of buffers)×voltage²×frequency;

and a logic system power estimation program which estimates the logic system power with said ratio of clock power/logic power calculated at said number of FF and the ratio of clock/logic estimation program, and said modifiable circuitry part estimation program sums up the clock system power and the logic system power.

27. Recording media in accordance with claim 26, wherein:

said number of buffers of the clock tree is calculated by the following operation, first said number of FF is divided by the number of fanout and the divided result is divided by the number of fanout and this dividing is continued until the result becomesless than 1.

28. Recording media in accordance with claim 21, wherein:

said modifiable circuitry part estimation program, at the case that the modifiable circuitry part of the new LSI chip has clock frequencies of plural systems, estimates the clock system power in each clock frequency and estimates the clock power of the modifiable circuitry part summing up these plural clock system power.

29. Recording media in accordance with claim 21, wherein:

said I/O part estimation program estimates the I/O part power of the LSI chip by the following equation, I/O part power=load capacity×voltage²×frequency×number of pins.

30. Recording media in accordance with claim 21, wherein:

said chip power calculation program calculates the internal power ratio of the LSI chip.

\* \* \* \* \*